US007258378B2

(12) United States Patent
Bellandi et al.

(10) Patent No.: US 7,258,378 B2
(45) Date of Patent: Aug. 21, 2007

(54) STRUCTURE OF IMPROVED PNEUMATIC GRIPPER ASSEMBLIES

(75) Inventors: Giuseppe Bellandi, Roncadelle (IT); Giuseppe Maffeisi, Roncadelle (IT)

(73) Assignee: Gimatic S.p.A. (IT)

( * ) Notice: Subject to any disclaimer, the term of this patent is extended or adjusted under 35 U.S.C. 154(b) by 214 days.

(21) Appl. No.: 10/502,774

(22) PCT Filed: Feb. 10, 2003

(86) PCT No.: PCT/IT03/00066

§ 371 (c)(1), (2), (4) Date: Jul. 26, 2004

(87) PCT Pub. No.: WO03/068456

PCT Pub. Date: Aug. 21, 2003

(65) Prior Publication Data

US 2005/0093318 A1 May 5, 2005

(30) Foreign Application Priority Data

Feb. 13, 2002 (IT) .......................... BS2002A0009
Sep. 9, 2002 (IT) .......................... BS2002A0082

(51) Int. Cl.
*B25J 15/08* (2006.01)
(52) U.S. Cl. ........................ 294/88; 294/119.1; 901/37
(58) Field of Classification Search ................. 294/88, 294/119.1, 116, 94; 901/37; 269/32, 34
See application file for complete search history.

(56) References Cited

U.S. PATENT DOCUMENTS

| | | | |
|---|---|---|---|
| 3,386,297 A * | 6/1968 | Willis .......................... 74/99 R |
| 4,647,097 A * | 3/1987 | Lessway ....................... 294/88 |
| 4,729,588 A * | 3/1988 | Kratzer ......................... 294/88 |
| 4,913,481 A * | 4/1990 | Chin et al. .................... 294/88 |
| 5,125,708 A * | 6/1992 | Borcea et al. ................ 294/88 |
| 5,284,375 A * | 2/1994 | Land, III ...................... 294/88 |
| 5,904,358 A | 5/1999 | Hosono et al. |
| 6,186,570 B1 * | 2/2001 | Trenner et al. .......... 294/119.1 |
| 6,273,485 B1 | 8/2001 | Maffeis et al. |
| 6,394,521 B1 * | 5/2002 | Bertini ......................... 294/88 |
| 6,547,258 B2 * | 4/2003 | Mandokoro et al. ........ 279/4.12 |
| 2001/0038215 A1 | 11/2001 | Moilanen et al. |

FOREIGN PATENT DOCUMENTS

| | | |
|---|---|---|
| DE | 197 04 444 | 5/1998 |
| DE | 197 41 983 | 4/1999 |
| EP | 0 313 947 | 5/1989 |

* cited by examiner

*Primary Examiner*—Dean J. Kramer
(74) *Attorney, Agent, or Firm*—McGlew and Tuttle P.C.

(57) ABSTRACT

The invention relates to a pneumatic gripper assembly structure which comprised a supporting body (11, 111) composed of at least two wall elements or symmetrical half-shells (15, 115), realized and finished individually using a forming process and then put together to form a single body capable of receiving, supporting and guiding other structural and functional components of the gripper assembly. The complementary wall elements or half-bodies are produced using die-casting, sintering or forging techniques with material compatible for such processes and provides a housing for jaws and a drive piston of the gripper.

10 Claims, 7 Drawing Sheets

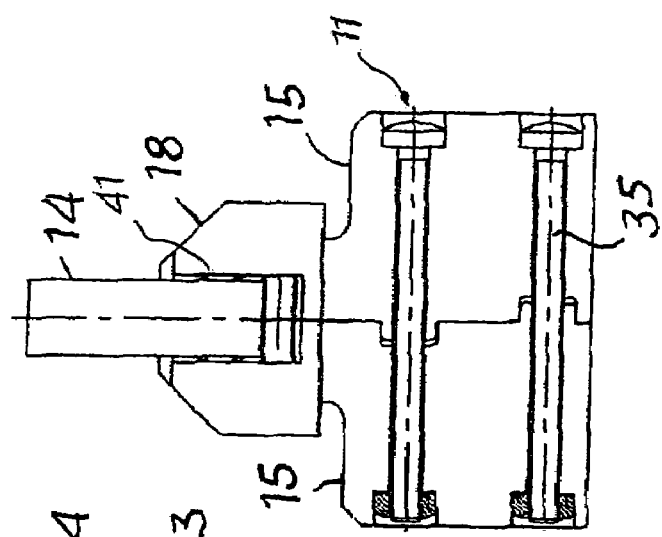
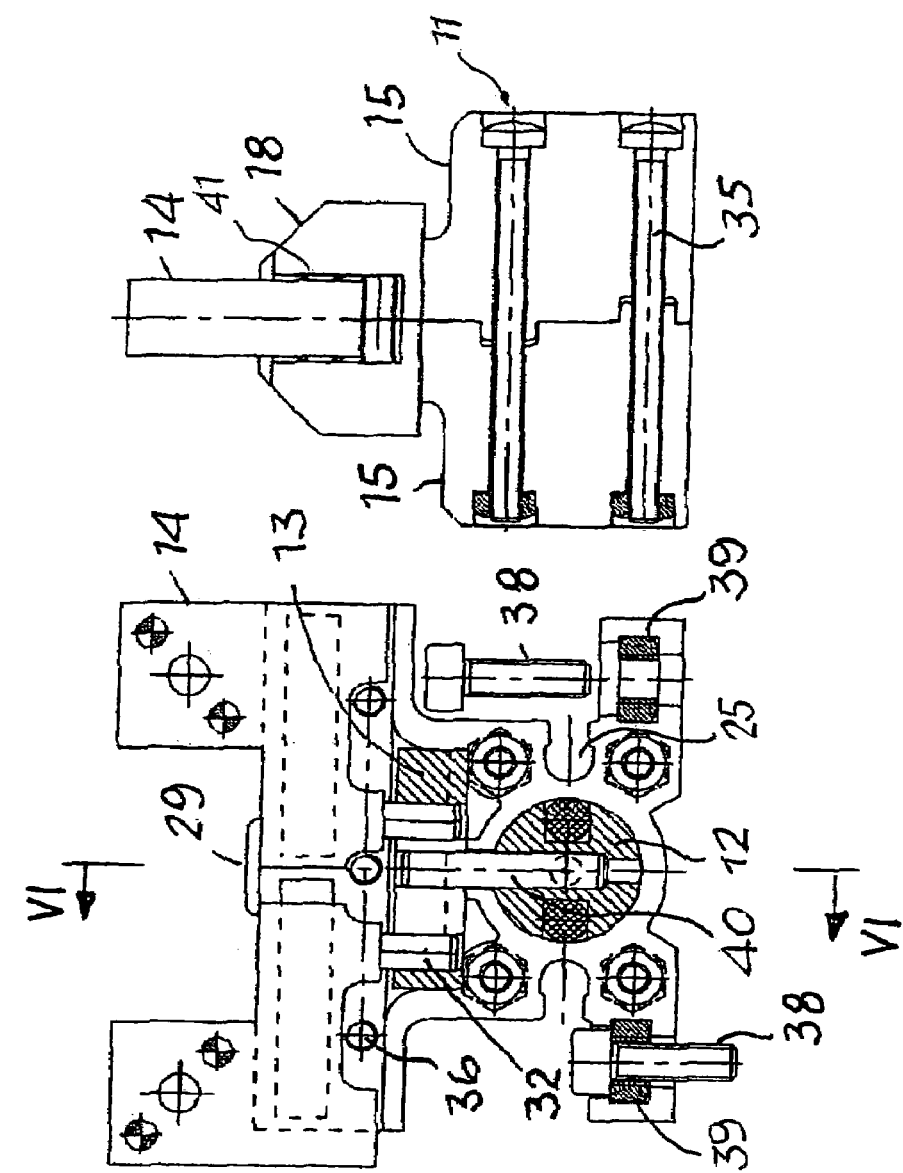
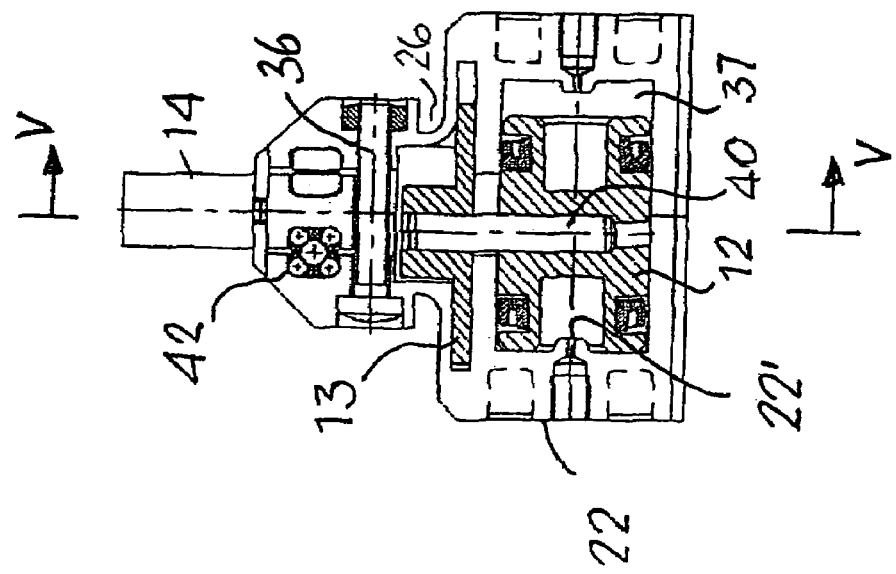

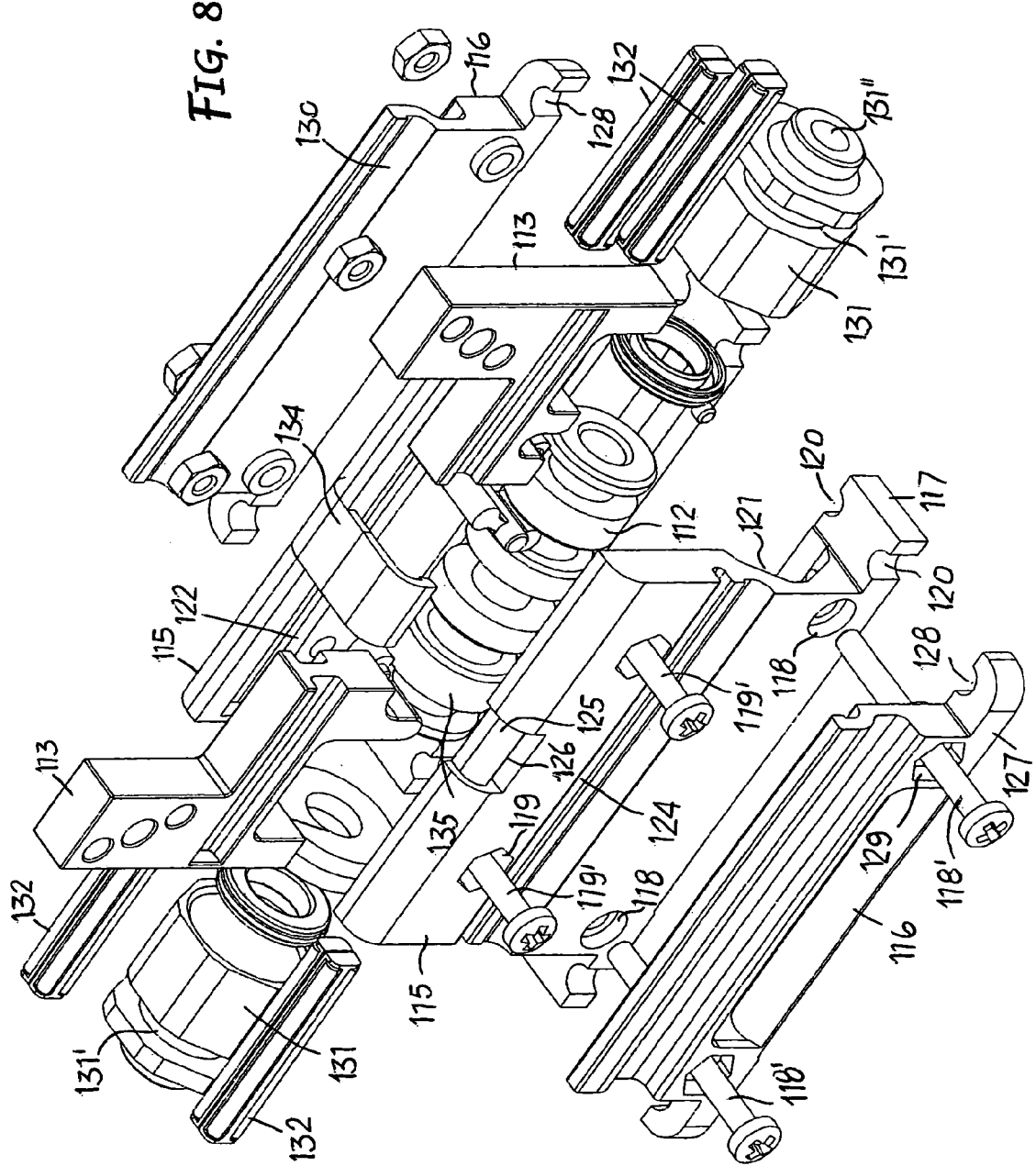

STRUCTURE OF IMPROVED PNEUMATIC GRIPPER ASSEMBLIES

FIELD OF INVENTION

This invention concerns pneumatic gripper assemblies in general used for securing items being machined and/or for automatic manipulation, and refers in particular to improved components for setting up such assemblies.

STATE OF THE ART

Both linear and angular pneumatic grippers, of the type taken into consideration here, are well known as regards to structure and functioning. They can be of different shapes, sizes and capacity, but each one is made up essentially of a supporting body, a simple or double-acting piston, moving either in a chamber or jacket in said body, and two jaws supported and guided in the body, working in conjunction with the piston, moving straight or at an angle in opposite directions in response to the alternating movements of the piston and supporting two item gripper jaw.

According to the known techniques, the components of said pneumatic gripper assemblies are machined on tool machines. In particular the body of a pneumatic gripper assembly is enbloc and is made starting from an unfinished piece, machined and bored as required to receive the operating components and the accessories which make up the gripper assembly.

As the technicians in this sector are well aware, the construction process of similar gripping assemblies is extremely laborious and painstaking due to the machining and operating times needed and often because of the fine tolerances required. The need to find innovative methods to produce pneumatic gripper assemblies of the type subject of this invention which are simpler and less costly, without having to machine or at least which reduce the machining operations greatly stems from this requirement.

On the other hand, forming techniques of elements such as die-casting, sintering, and forging which enable the production of items, even finished, with relatively complex shapes, with fine tolerances or however with a high level of precision, both as regards to size and surface finishing, and with the possibility of surface treatments, depending on necessity, at least in the case of sintered items, are well known.

These forming techniques, although well established in practice, have never been adopted in the gripper assembly manufacture field or if used only limited to basic components also because the configuration of the elements of these grippers, used in the traditional way, do not enable it.

OBJECTIVES AND SUMMARY OF THE INVENTION

This invention has been conceived to meet the above-mentioned requirement and to be able to take good advantage of the forming techniques of the items referred to above also in the manufacture of pneumatic gripper assemblies and to create the conditions to eliminate or at least minimise machining and assembling times and costs.

It in fact an objective of this invention to present and supply components for setting up pneumatic gripper assemblies, designed so as to be able to be produced using one or the other of the forming techniques for die-casting, sintering and forging and then assembled using simple fixing systems.

Another objective of the invention is the realisation of pneumatic gripper assemblies, each one made up of a limited number of pre-formed elements capable of fitting complementarily one with the other and with inserted auxiliary elements, ensuring the functionality of the resulting group improving in fact performance and life.

A further objective of the invention is to supply a linear or angular pneumatic gripper assembly which is easy to set up using a "sandwich" type assembly of the supporting and functional components.

To achieve the invention, the supporting body of a gripper assembly was disassembled into complementary parts to be produced separately using one of the above said techniques and then to be assembled to form one solid group capable of receiving, supporting and guiding other structural and functional components of the gripper.

The structure of a pneumatic gripper assembly according to the invention is substantially the one conforming with claim 1.

BRIEF DESCRIPTION OF DRAWINGS

Greater details of the invention will become more evident in the following description made with reference to the indicative and non-limiting drawings enclosed, in which:

FIG. 5 is a longitudinal cross-section of the assembled gripper unit in direction of arrows V-V in FIG. 6;

FIG. 6 is a cross-section of the assembled gripper in the direction of arrows VI-VI in FIG. 5;

FIG. 7 is a further cross section of the gripper assembly on a level with the two anchoring bolts;

FIG. 8 is an exploded view in prospective of the components of a linear pneumatic gripper assembly in compliance with a variation in construction;

DETAILED DESCRIPTION OF THE INVENTION

Figure 1:
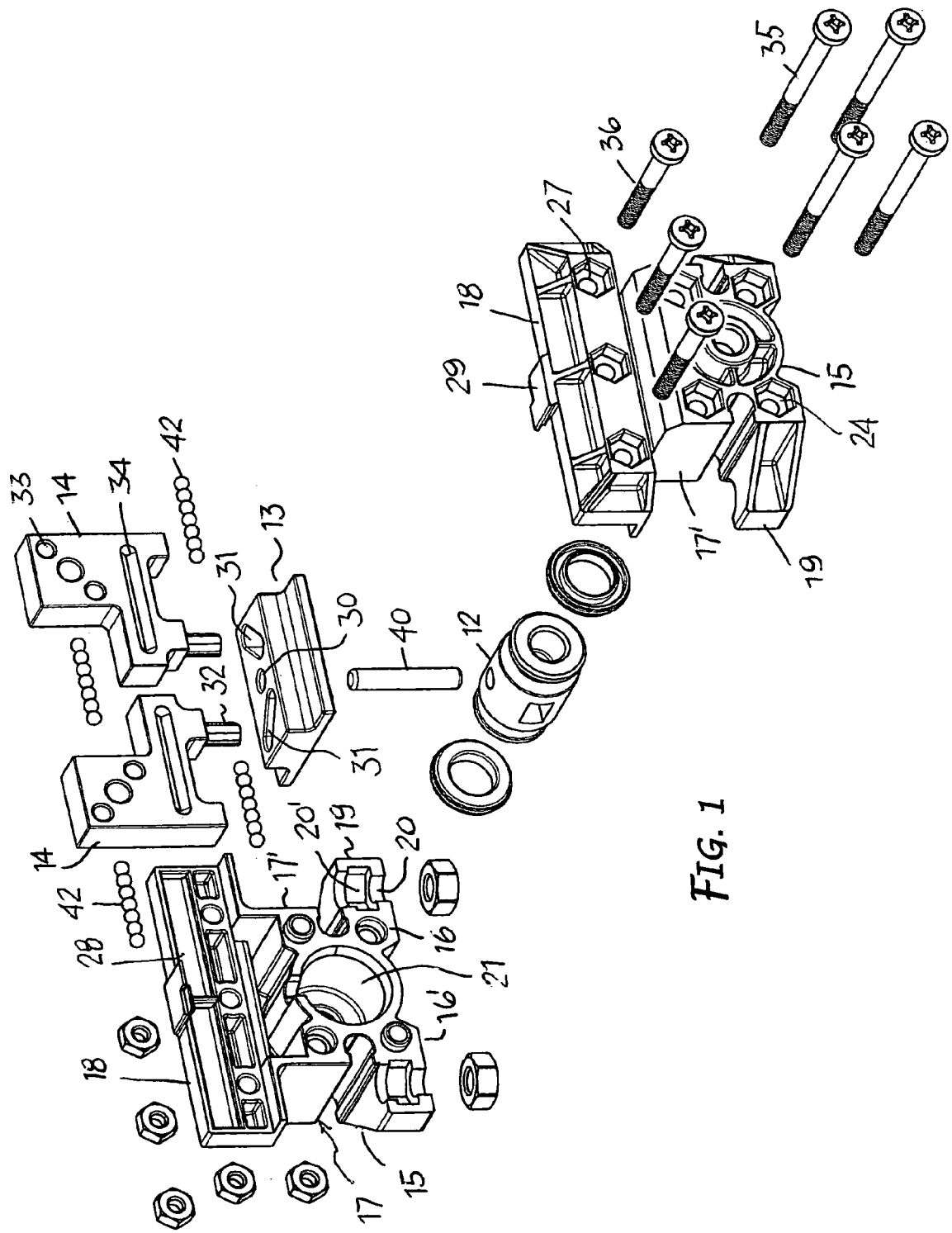
FIG. 1 is an exploded view in prospective of the components for the construction of a linear pneumatic gripper assembly.
Figure 2:
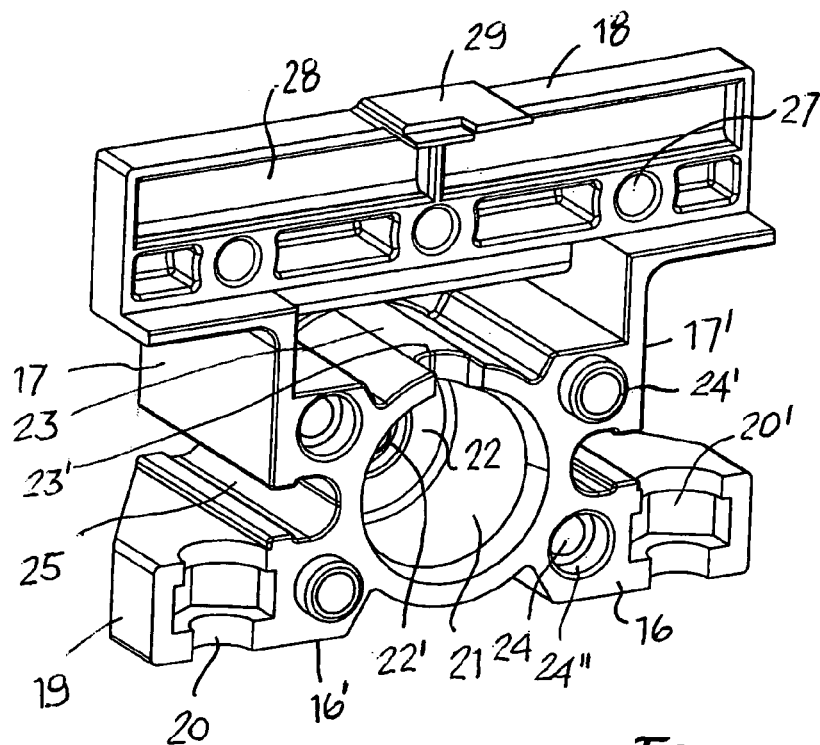
FIG. 2 is an enlarged view of a half-body for the formation of the gripper assembly body.
Figure 3:
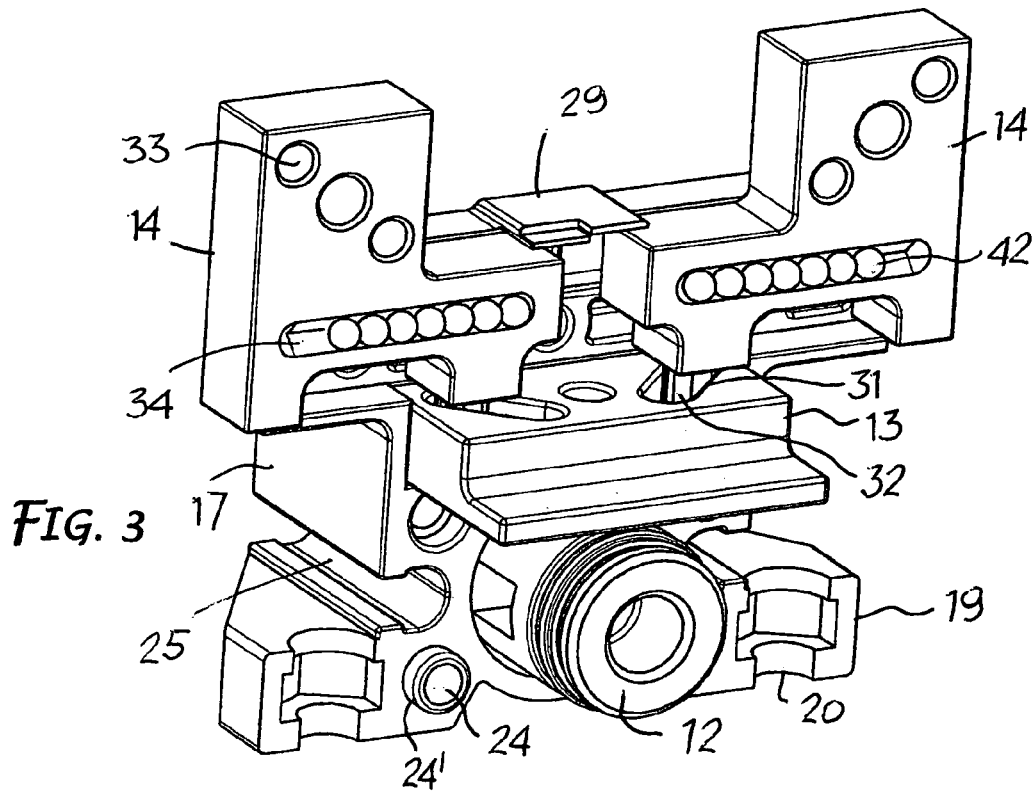
FIG. 3 is a linear pneumatic gripper assembly with the components in FIG. 1 partially assembled.
Figure 4:
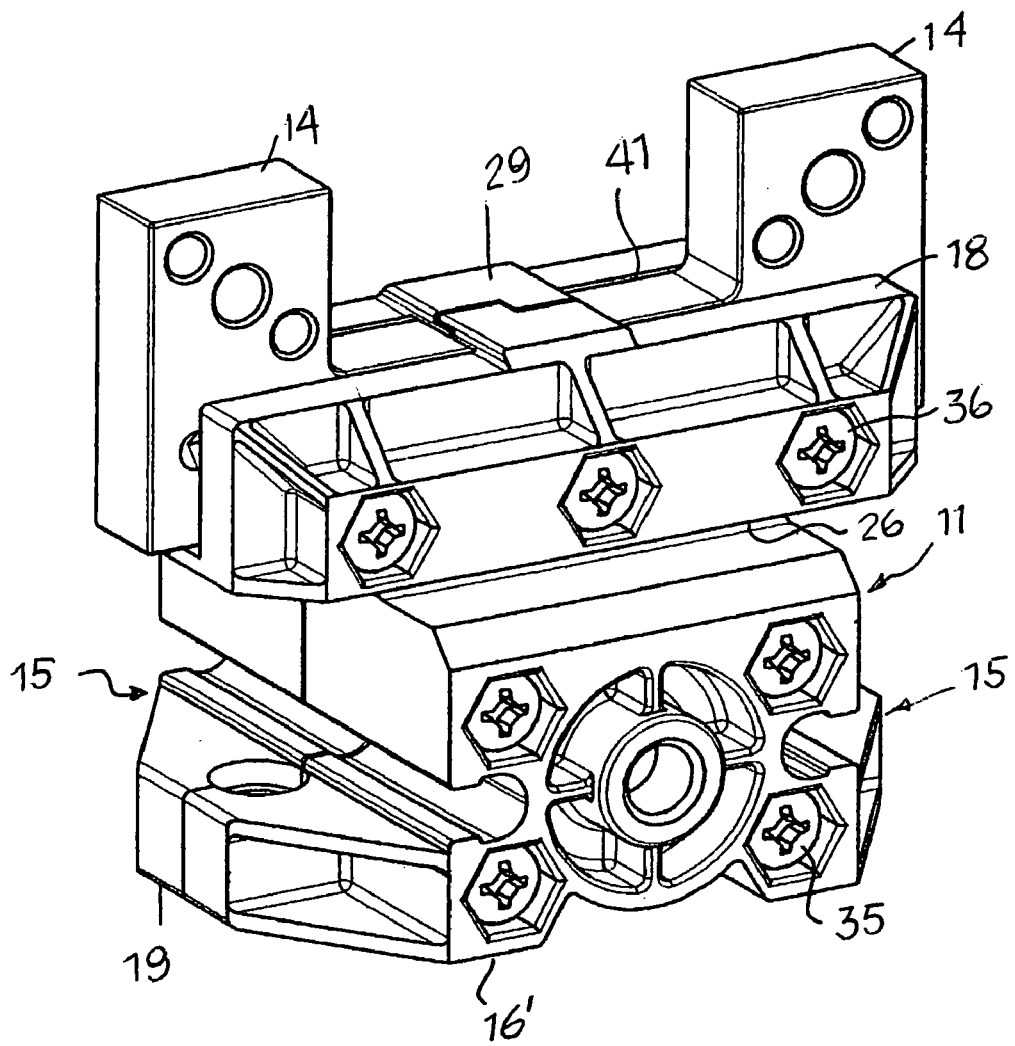
FIG. 4 is a view in prospective of the linear pneumatic gripper assembly, completed assembled.

Both the linear and angular pneumatic gripper assembly represented comprises a supporting body 11, an alternating piston 12 moving in said body, a drive system 13 associated with the piston and two jaws 14 driven by the piston, moving in opposite directions by means of the drive system 13 and each one can be equipped with jaw shoes not shown. The only difference between the two types of pneumatic grippers is that the jaws in the linear grippers are subjected to rectilinear movements in opposite directions, whereas in the angular grippers the jaws turn each one on a pin, performing angular movements in opposite directions in response to the movements of the piston.

According to a construction method as illustrated in FIGS. 1-7, the supporting body 11 is made up of two exactly equal elements or symmetric half-bodies or shells 15. They therefore can be made advantageously from the same mould, using die-casting, sintering or a forging systems in any appropriate material.

The two half-bodies 15 are placed one facing the other, they fit one into the other and are fixed together. Each one has a support plane 16 from which an intermediate part rises 17, with two sides 17', which is topped by a straight flat section 18.

The supporting plane 16 forms a support base 16' and, on the two opposite sides it has two ears 19 protruding from the intermediate section 17 each one having a half hole 20 perpendicular to the support base 16' and open towards the opposite semi-body. At the height of each half hole 20 a semi-hexagonal recess 20' can be formed.

A cylindrical cavity 21 has been machined at the height of the intermediate section 17, the axis of which is parallel to the support base 16'. The cavity 21 is closed by a bottom wall 22 in which a hole 22' is provided and opens towards the half-body opposite. In the top part of cavity 21, there is a slide surface 23 at one end of which, on the open side of the cavity itself, has been formed a semi-slot 23'. On the parts opposite to cavity 21, on a parallel with its axis, holes 24 have been provided, for example two on each side placed symmetrically to each other. Preferably, centring protrusions 24' are provided at the height of the two said diagonally opposite holes 24, on the open side of cavity 21, whereas at the height of the other holes there are complementary housings 24". On each side 17' of the intermediate section 17 a duct 25 is provided which runs parallel to the axis of cavity 21.

The top part 18 of the half-body 15 is at a right angle to the cylindrical cavity 21 axis. A flexing groove 26 is provided externally, between the top part 18 and the intermediate part 17. Two or more transversal holes 27 are provided in the top part 18 on at one level and, above these, in the internal face of the part itself a longitudinal groove divided by an intermediate baffle has been formed. A tongue 29 has been provided in a central position on the top side of part 18 facing inwards, that is to say towards, a similar tongue on the opposite half-body.

The drive system 13 as well as the jaws can also be produced using the same forming techniques used in making the half-bodies 15.

In particular, the drive system 13 has a central hole 30 and, on the opposite sides to the latter, two slots 31 in a V formation.

The jaws 14 are the identical and can be made from the same mould. Each jaw 14 has a connecting pin 32 for coupling with the drive system 13, transversal holes 33 at the top, and on each side a groove 34 which will be at the same height and opposite the groove 28 on the internal face of the top part 18 of the adjacent half-body.

When setting up a gripper assembly, the two elements or half-bodies 15 are placed one in front of the other and bolted tightly together using bolts 35 inserted in the transversal holes 24 in the sides of the cylindrical cavity 21 and other bolts 36 inserted in the transversal holes 27 at the height of the top part 18. When the two half-bodies are united, their cavities 21 are in line and form a chamber 37—FIG. 5, 6—in which the piston 12 driving the jaws 14 is housed. If the piston is double-acting, the piston 12 is driven by a fluid under pressure, delivered/discharged alternately in the chamber 37 by means of ducts connected to the bottom walls of the cavity at the same level as holes 22'. If the piston is single-acting, the piston is driven in one direction by the fluid fed to chamber 37 and return is spring driven.

When the half-bodies are assembled together, the side ears form with there half-holes, holes for the anchoring screws 38 of the gripper unit on the support. Advantage only each of said holes, thanks to the semi-hexagonal hollows 20', can house and hold a nut 39 which means that the respective anchoring screws can be applied both from the top or bottom according to needs—FIG. 5.

The driver 13 is positioned on the slide surface 23 above the piston chamber 12 and is connected to the latter by means of a pin 40 inserted into its central hole 30 and passing through to insert into the slot formed by the half-slots 23' of the two united half-bodies.

The top facing parts 18 of the two half-bodies 15 form a guide housing 41, and the jaws 14 are placed in said housing together with interposed ball bearings 42. Each jaw is associated, through its respective connecting pin 32, with a slot 31 of the driver 13 so that the jaws move in opposite directions in response to the alternating movements of the piston 12.

The bearings 42 are positioned between the internal grooves 28 of the top part 18 of the half-bodies and the lateral grooves 34 of the jaws themselves. Furthermore, by tightening or loosening the anchoring screws 36 passing through the transversal holes 27 in the top parts of the half-bodies and thanks to the flexing groove 26 along the base of each of said parts it is possible to calibrate their nearness in order to establish a correct preload of the assembled functional elements and to be able to recover play and coupling wear.

Jaws shoes can be fixed to the holes 33 of the jaws 14 as required. The top tongues 29 of the top part of the half-bodies, when brought together form a protective portion—FIG. 4—suitable for stopping dust or dirt entering the space between the grippers 14. The lateral ducts 25 of the half-bodies 15 can be used to apply accessories to the gripper assemblies, such as for example end of stroke sensors and so on.

In compliance with the invention and according to a another method of construction illustrated in FIGS. 8-12, the gripper assembly has a supporting body 111 made up of several complementary parts which include two opposite wall elements 115 and two side elements 116, all those elements being formed by die-casting, sintering or forging of any appropriate material.

The two wall elements or cheek 115 are the identical, therefore can be made from the same mould. They are positioned one facing the other, and each one has a base plane 117, at least one lower couple of transversal holes 118 just above the base plane and at least one higher couple of transversal holes 119 at a different level.

The base plane 117 has two semi-holes 120 perpendicular to each of its ends, one facing inwards and the other facing outwards in relation to the body.

Longitudinally, the internal face of each cheek 115, the one facing the other cheek, has a recess 121 which may be cylindrical, but preferably with faceted surfaces, that is polygonal, viewed in cross-section. Each cheek 115 has a groove 122 on the internal surface which runs parallel to the longitudinal recess 121 above it and closed at both ends.

Longitudinally, the external face of each cheek 115 has a semi-duct 123 at one level and a flexing groove 124 at a higher level, between the bottom and top couple of holes 118, 119. On the top of each cheek 115 there is a central positioned recess 125 with a coupling lug 126.

The two side elements 116 are the identical, therefore can be made from the same mould. Each one is positioned externally and positioned against a relative wall element or cheek 115 and is lower in height to the level of the top couple of holes 119 of the cheeks.

Each side element has a base plane 127 with two semi-holes 128 at its ends on the side facing towards the adjacent cheek, and above the base plane, a couple of transversal holes 129 in line with the bottom couple of holes 118 of the cheeks 115. In addition, on the internal face, the one facing the adjacent cheek, each side element has a complementary semi-duct 130 running longitudinally and at the same level as the external semi-duct 123 of said cheek.

The external walls of the opposite wall elements or cheek 115 and the side elements 116 are screwed tightly together to form the supporting body using bolts 118', 119' passing through the couple of transversal holes 118, 119 in line. Consequently, the semi-holes 120, 128 at the ends of the base plane of the wall elements and the side elements form in combinations of two by two the holes of the gripper assembly anchoring screws. The wall elements with the recesses 121 on the adjacent faces form a housing for two casings or cylinders 131 Which determine two separate sleeves or chambers in which to house a piston 112 with its opposite ends.

The casings or cylinders 131 can also be made using a forming and finishing technique as used to make the wall and side elements. To be noted that the casings or cylinders 131 have a polygonal external surface which fit together with the one with the recesses 121 forming the housing they fit into. In this way the casings or cylinders are prevented from turning without having to provide other additional systems. Furthermore, each casing or cylinder 131 has a tapered neck 131' in which an anchoring bolt 118' passes which besides helping in assembling the body 11 helps to achieve axial blocking of the respective casing or cylinder without having to insert flanges or covers as are required in the known technique.

Figure 9:
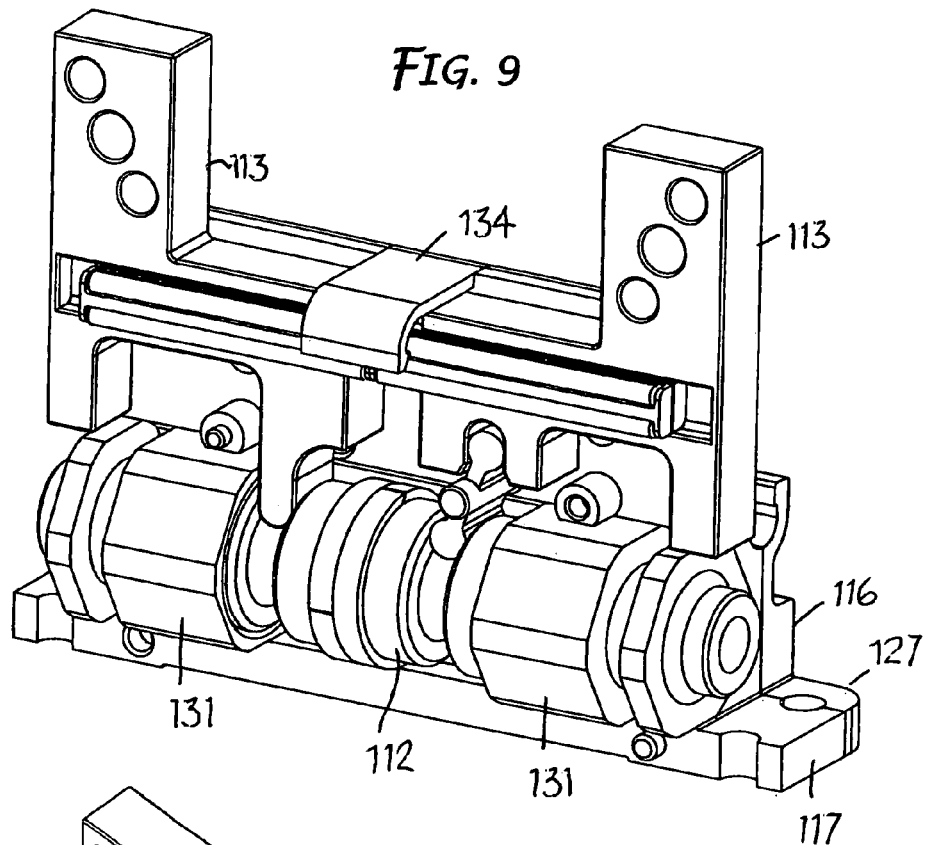
FIG. 9 is a partially assembled linear pneumatic gripper assembly as shown in FIG. 8.
Figure 10:
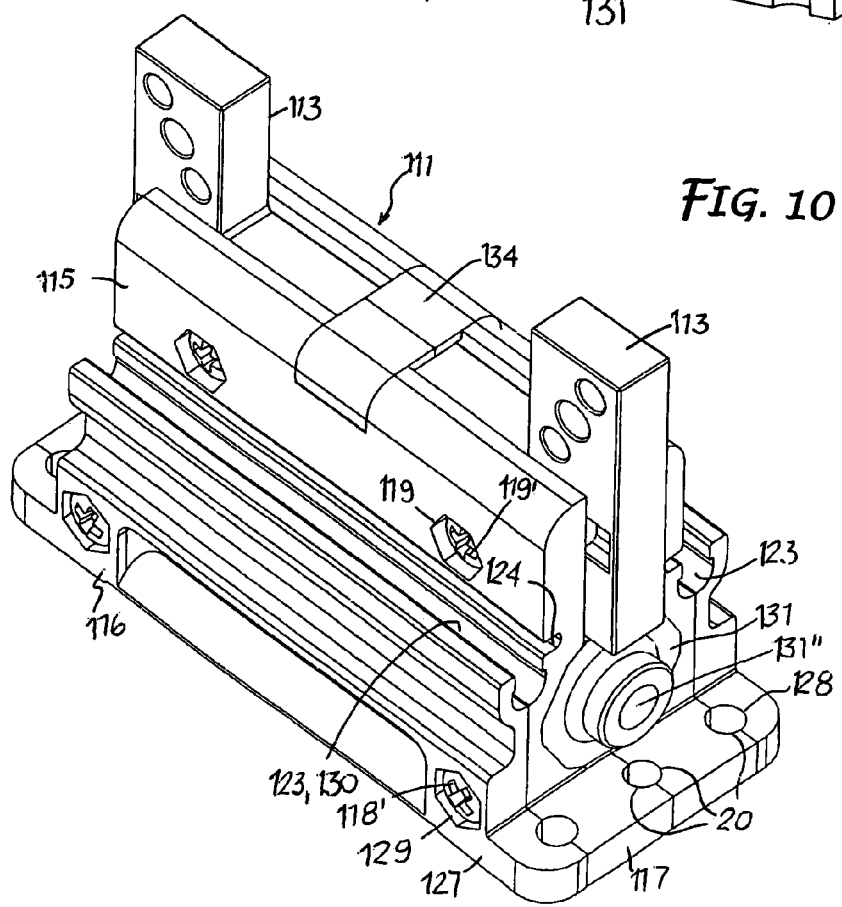
FIG. 10 is a view in prospective of the completely assembled linear pneumatic gripper assembly.
Figure 11:
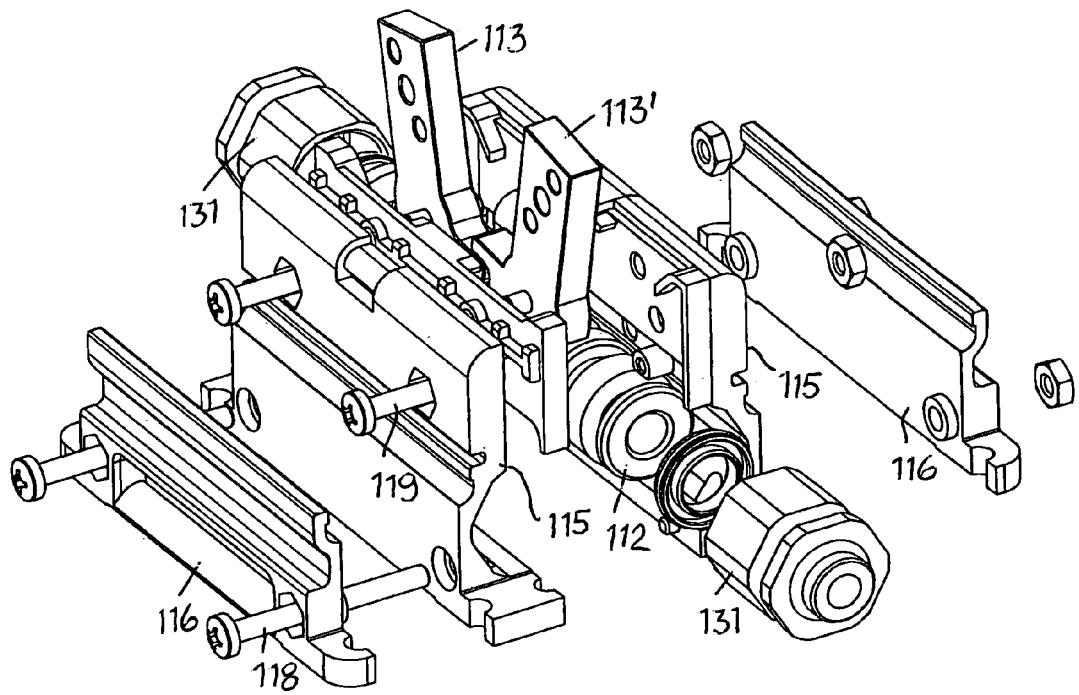
FIG. 11 is an exploded view of the components of an angular pneumatic gripper assembly.
Figure 12:
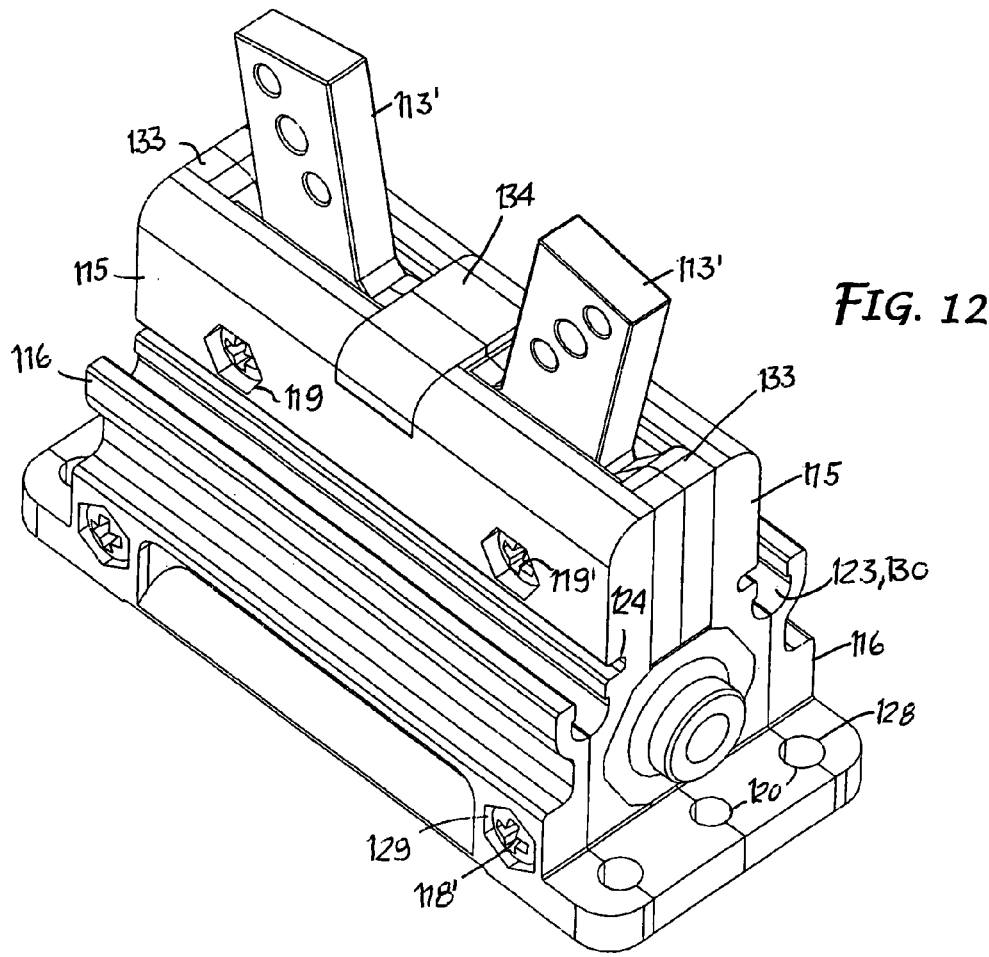
FIG. 12 is a view in prospective of the fully assembled angular pneumatic gripper assembly.

Ball bearing raceway retainers 132 are fitted into the grooves 122 in the internal faces of the wall elements or cheek 115, which in linear gripper assemblies—FIGS. 8 and 9—act as linear guide bearings for the movements of the jaws 113.

These jaws 113, as is also the case for the jaws 113' for an angular pneumatic gripper assembly, may also be achieved with one of the abovementioned forming techniques.

Both the jaws 113 for a linear gripper assembly and the oscillating jaws 113' for angular gripper assemblies are coupled to the alternating piston 112 in the known way. In the case of oscillating jaws 113, antifriction and protective lining elements 133 can be inserted between the latter and the cheeks against penetration of dirt from outside.

The piston can be double-acting, in which case each casing or cylinder is connected to a source of fluid under pressure by means of a coupling 131", with alternating delivery/discharge of the fluid in the two sleeves.

The piston 112 can also be single-acting, in which case one of the chambers formed by the casings or cylinders 131 is fed/discharged alternately by a fluid under pressure, while in the other chamber, between the latter and the piston, there will be a return spring, not shown.

Furthermore, in the top part of the wall elements, in line with the central recesses 125 a protection plate 134 suitable for preventing dust and dirt penetrating between jaws 113, 113' is assembled and snap locked thanks to the coupling lugs 126.

The adjacent semi-ducts 123 and 130 of each wall element or cheek 115 and respective side element 116 forming together a duct along which accessories such as magnetic end of stroke sensors can be made available and positioned.

In addition and worthy of note is that the casings or cylinders 131 forming the chamber for the piston 112 are separated at an axis one from the other leaving a space between them which means a permanent ring magnet 135 can be applied around the piston 112 moving with it which has a greater bore than the external diameter of the piston itself. With this expedient, the magnet 135 is closer to the end of stroke magnetic sensors which may be inserted and positioned along the external ducts of the body.

By tightening or loosening the anchoring screws 119' passing through the top couple of transversal holes 119 and thanks to the flexing groove 124 along each wall element 115 it is possible to calibrate their nearness of the wall elements order to establish a correct preload of the assembled functional elements and to be able to recover play and coupling wear.

It consequently seems evident that a type of gripper assembly as described here can be realised starting from a minimum number of pre-formed components, which in substance do not require machining and which are undemanding to assemble using only anchoring screws.

The invention claimed is:

1. A pneumatic gripper assembly structure comprising:
a supporting body, said supporting body being formed of at least two symmetrical half-shells, said at least two symmetrical half-shells being formed individually in a single mold, one symmetrical half-shell being arranged opposite another symmetrical half-shell such that said one half-shell is in contact with another symmetrical half-shell, said one symmetrical half-shell being connected to another symmetrical half-shell to form a single body for receiving, supporting and guiding other structural and functional components of the gripper assembly, said at least two symmetrical half-shells being formed using die-casting, sintering or forging techniques, said one half-shell being mirror symmetrical to another half-shell;
a piston moving alternately in a chamber of said supporting body;
two jaws supported and guided in said supporting body; and
a driver arranged between said piston and said two jaws, said driver being coupled to said piston by means of a connecting pin, said driver being connected to said jaws by means of diverging slots, each jaw having a bottom pin engaged in one of said slots for moving said jaws in opposite directions in response to alternating movements of said piston.

2. A pneumatic gripper assembly structure according to claim 1, wherein said supporting body is composed of two equal half-bodies arranged one facing the other and coupled together by fixing bolts transversely oriented by the half-bodies.

3. A pneumatic gripper assembly structure according to claim 2, wherein each half-body has a supporting base from which an intermediate part rises topped by a rectilinear part, wherein said supporting base has on opposite sides, two ears protruding from the intermediate part each having a semi-hole open towards one half-body disposed opposite another half body, wherein on a level with said intermediate part a cylindrical cavity on a parallel axis with said supporting base is formed, said cavity being closed by a base wall which has a through hole and open towards one half-body disposed opposite another half body, said cavity having at the top a slide plane with a half-slot at the end of the open side of the cavity itself, wherein from opposite sides of said cavity, parallel to its axis, symmetrically positioned holes are formed, wherein in the top part two or more transversal holes are provided at one level and above these, in the internal face of the top part itself, a longitudinal groove, and in which with the half-bodies put together, the holes besides the cavity and on a level with the top part are designed to receive anchoring bolts of the half-bodies, the cavities of the half-bodies being aligned to form a chamber for the piston, and the top parts of the half-bodies form a housing and guide for the jaws and are fixed together by bolts screwed into the respective transversal holes.

4. A pneumatic gripper assembly structure according to claim 3, wherein said longitudinal groove in the top part of each half-body is opposite a similar groove in the adjacent side of each jaw to receive ball bearings for guiding and sliding of said jaws.

5. A pneumatic gripper assembly structure according to claim 3, wherein said driver rests on the slide plane above the chamber for the piston.

6. A pneumatic gripper assembly structure according to claim 1, wherein a duct for the application of accessory devices is formed in the opposite sides of an intermediate part of each half-shell.

7. A pneumatic gripper assembly structure according to claim 1, wherein a flexing groove to vary the grip of each jaw located between a top part of each half-shell and relatively to guide bearings is formed between an intermediate part and the top part of each half-shell.

8. A pneumatic gripper assembly structure according to claim 1, wherein a nut is inserted into a hole of each ear of a supporting base, said nut receiving a fixing screw of the gripper assembly.

9. A pneumatic gripper assembly structure according to claim 1, wherein the two half-shells have tabs which overlap parts of the jaws.

10. A pneumatic gripper assembly structure comprising:
a supporting body, said supporting body being formed of at least two wall elements, said at least two wall elements being formed individually, one wall element being connected to another wall element to form a single body for receiving, supporting and guiding other structural and functional components of the gripper assembly, said at least two wall elements being formed using die-casting, sintering or forging techniques, each wall element having a top part and an intermediate part and a flexing groove formed between said top part and said intermediate part;
a piston moving alternately in a chamber of said body; and
two jaws supported and guided in said body, associated with the piston, moving in opposite directions in response to the alternate movements of piston, said flexing groove varying the grip of said jaws.

* * * * *